US012470003B2

(12) United States Patent
Yamamoto et al.

(10) Patent No.: US 12,470,003 B2

(45) Date of Patent: Nov. 11, 2025

(54) MOLDED CONNECTOR

(71) Applicant: Sumitomo Wiring Systems, Ltd., Yokkaichi (JP)

(72) Inventors: Hironobu Yamamoto, Yokkaichi (JP); Toshinari Kobayashi, Yokkaichi (JP); Yukitoshi Terasaka, Yokkaichi (JP); Kyungwoo Kim, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 342 days.

(21) Appl. No.: 18/042,813

(22) PCT Filed: Jul. 28, 2021

(86) PCT No.: PCT/JP2021/027821

§ 371 (c)(1),
(2) Date: Feb. 24, 2023

(87) PCT Pub. No.: WO2022/044663

PCT Pub. Date: Mar. 3, 2022

(65) Prior Publication Data

US 2023/0335933 A1 Oct. 19, 2023

(30) Foreign Application Priority Data

Aug. 26, 2020 (JP) ................................ 2020-142624

(51) Int. Cl.

*H01R 13/405* (2006.01)
*H01R 13/422* (2006.01)
(Continued)

(52) U.S. Cl.

CPC ......... *H01R 13/405* (2013.01); *H01R 13/422* (2013.01); *H01R 13/514* (2013.01); *H01R 13/5205* (2013.01)

(58) Field of Classification Search

CPC .. H01R 13/405; H01R 13/422; H01R 13/514; H01R 13/5205; H01R 13/504;
(Continued)

(56) References Cited

U.S. PATENT DOCUMENTS 4,484,792 A * 11/1984 Tengler ................ H01R 13/514 439/736
5,269,703 A * 12/1993 Ikegami ............. H01R 13/6586 439/607.49

(Continued)

FOREIGN PATENT DOCUMENTS

JP H11-31572 A 2/1999
JP 2002-170612 A 6/2002

(Continued)

OTHER PUBLICATIONS

International Search Report, Application No. PCT/JP2021/027821, mailed Sep. 28, 2021.

*Primary Examiner* — Truc T Nguyen
(74) *Attorney, Agent, or Firm* — Honigman LLP

(57) ABSTRACT

This disclosure aims to provide a technique with which the waterproofness of a connector can be enhanced. The molded connector includes: a first terminal unit that includes a first connector terminal and a first holder that holds the first connector terminal; a second terminal unit that includes a second connector terminal and a second holder that holds the second connector terminal, and is stacked on the first terminal unit; a first wire connected to the first connector terminal; a second wire connected to the second connector terminal; and a connector housing formed through insert molding, using the first terminal unit, the second terminal unit, an end portion of the first wire, and an end portion of the second wire as insert parts.

7 Claims, 12 Drawing Sheets

(51) Int. Cl.
*H01R 13/514* (2006.01)
*H01R 13/52* (2006.01)

(58) Field of Classification Search
CPC ............ H01R 13/5216; H01R 13/5845; H01R 43/005; B29C 45/14336; B29C 45/14639; B29C 45/1615; B29C 45/1671; B29L 2031/36
See application file for complete search history.

(56) References Cited

U.S. PATENT DOCUMENTS

| | | | | | |
|---|---|---|---|---|---|
| 5,915,992 | A * | 6/1999 | Conorich | H01R 4/2433 | 439/456 |
| 5,954,533 | A * | 9/1999 | Hatagishi | H01R 43/01 | 439/942 |
| 6,162,087 | A | 12/2000 | Hiura | | |
| 6,786,775 | B1 * | 9/2004 | Hanrahan | H01R 24/64 | 439/676 |
| 7,351,117 | B1 * | 4/2008 | Mostoller | H01R 13/506 | 439/744 |
| 7,632,148 | B1 * | 12/2009 | Kawamura | H01R 24/22 | 439/607.41 |
| 10,630,008 | B2 * | 4/2020 | Volpin | H01R 43/24 | |
| 11,646,534 | B2 * | 5/2023 | Zhu | H01R 13/6585 | 439/607.08 |
| 2004/0229508 | A1 * | 11/2004 | Miyazaki | H01R 13/6485 | 439/607.01 |
| 2006/0228932 | A1 * | 10/2006 | Komiyama | H01R 13/514 | 439/467 |
| 2009/0203259 | A1 * | 8/2009 | Nguyen | H01R 13/514 | 439/607.23 |
| 2010/0136842 | A1 * | 6/2010 | Sakamoto | H01R 13/521 | 439/639 |
| 2014/0038459 | A1 * | 2/2014 | Kobayashi | H01R 13/6593 | 439/607.41 |
| 2015/0087175 | A1 * | 3/2015 | Stowers | H01R 13/518 | 439/284 |
| 2015/0099396 | A1 * | 4/2015 | Mori | H01R 13/405 | 439/606 |
| 2015/0214655 | A1 * | 7/2015 | Mori | H01R 13/504 | 439/606 |
| 2015/0214680 | A1 * | 7/2015 | Wu | H01R 13/6271 | 29/843 |
| 2016/0043500 | A1 * | 2/2016 | Mori | H01R 43/24 | 439/271 |
| 2016/0049746 | A1 * | 2/2016 | Gross | H01R 13/6461 | 439/660 |
| 2016/0322731 | A1 | 11/2016 | Onimoto | | |
| 2019/0103698 | A1 | 4/2019 | Takagi | | |
| 2024/0072472 | A1 * | 2/2024 | Zhang | H01R 13/504 | |

FOREIGN PATENT DOCUMENTS

| | | |
|---|---|---|
| JP | 2009-064690 A | 3/2009 |
| JP | 2019-003852 A | 1/2019 |
| JP | 2019-139874 A | 8/2019 |

* cited by examiner

MOLDED CONNECTOR

CROSS-REFERENCE TO RELATED APPLICATIONS

This application is the U.S. national stage of PCT/JP2021/027821 filed on Jul. 28, 2021, which claims priority of Japanese Patent Application No. JP 2020-142624 filed on Aug. 26, 2020, the contents of which are incorporated herein.

TECHNICAL FIELD

The present disclosure relates to a molded connector.

BACKGROUND

JP H10-294146a discloses a technique for waterproofing a connector by covering a connector housing and a wire extending from the connector housing with a rubber boot.

Connectors may need to have even better waterproof performance depending on the mounting positions of the connectors.

In view of this, this disclosure aims to provide a technique with which the waterproofness of a connector can be enhanced.

SUMMARY

A molded connector according to this disclosure is a molded connector including: a first terminal unit that includes a first connector terminal and a first holder that holds the first connector terminal; a second terminal unit that includes a second connector terminal and a second holder that holds the second connector terminal, and is stacked on the first terminal unit; a first wire connected to the first connector terminal; a second wire connected to the second connector terminal; and a connector housing formed through insert molding, using the first terminal unit, the second terminal unit, an end portion of the first wire, and an end portion of the second wire as insert parts.

Advantageous Effects of Disclosure

According to this disclosure, it is possible to enhance the waterproofness of a connector.

DETAILED DESCRIPTION OF PREFERRED EMBODIMENTS

Figure 1:
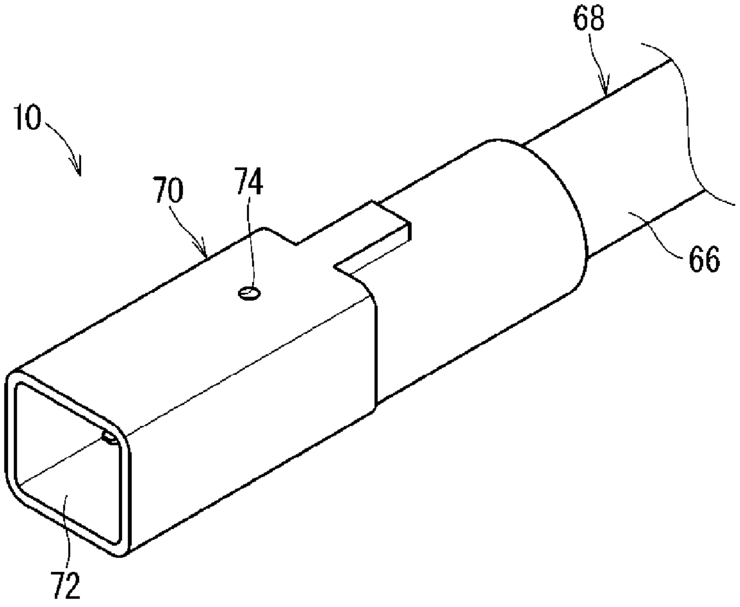
FIG. 1 is a perspective view showing a molded connector according to Embodiment 1.

Firstly, embodiments of the present disclosure will be listed and described.

A molded connector according to this disclosure is as follows.

First Aspect

In accordance with a first aspect, the molded connector according to this disclosure is a molded connector including: a first terminal unit that includes a first connector terminal and a first holder that holds the first connector terminal; a second terminal unit that includes a second connector terminal and a second holder that holds the second connector terminal, and is stacked on the first terminal unit; a first wire connected to the first connector terminal; a second wire connected to the second connector terminal; and a connector housing formed through insert molding, using the first terminal unit, the second terminal unit, an end portion of the first wire, and an end portion of the second wire as insert parts. Because the connector housing is formed through insert molding, using the first terminal unit, the second terminal unit, the end portion of the first wire, and the end portion of the second wire, as insert parts, the waterproofness of the connector can be enhanced.

Second Aspect

In a second aspect, the molded connector according to the first aspect further includes a sheath covering the first wire and the second wire, in which the connector housing may cover an end portion of the sheath. As a result, it is possible to inhibit water from entering the sheath from the end portion of the sheath.

Third Aspect

In a third aspect, the molded connector according to the first or the second aspect, the first terminal unit may be formed by subjecting the first holder to insert molding using the first connector terminal as an insert part, and the second terminal unit may be formed by subjecting the second holder to insert molding using the second connector terminal as an insert part. As a result, a gap between the connector terminal and the holder of each terminal unit can be reduced in size, thus enhancing the waterproofness of the molded connector.

Fourth Aspect

In a fourth aspect, the molded connector according to the third aspect, a first wire connecting portion of the first connector terminal that is connected to the first wire may protrude outward of the first holder, and a second wire connecting portion of the second connector terminal that is connected to the second wire may protrude outward of the second holder. As a result, it is possible to easily connect a wire to a connector terminal after each terminal unit is molded.

Fifth Aspect

In a fifth aspect, the molded connector according to fourth aspect, the first wire connecting portion may include a first bottom plate connected to a core wire of the first wire, the second wire connecting portion may include a second bottom plate connected to a core wire of the second wire, and the first bottom plate and the second bottom plate may be present between the core wire of the first wire and the core wire of the second wire. As a result, the core wires can be partitioned by the highly rigid bottom plates, thereby suppressing short circuiting between the core wires.

Sixth Aspect

In a sixth aspect, the molded connector according any one of the first to the fifth, a portion of the connector housing that covers the first holder and the second holder may be provided with a hole recessed in a direction in which the first terminal unit and the second terminal unit are stacked on each other. As a result, it is possible to position a positioning pin at a position of the hole when molding the connector housing, and thus suppress displacement of a plurality of terminal units in the stacking direction when molding the connector housing.

Seventh Aspect

In a seventh aspect, the molded connector according any one of the first to the sixth aspect, the first holder and the second holder may be each provided with a locking portion for positioning the first terminal unit and the second terminal unit in a direction intersecting a direction in which the first terminal unit and the second terminal unit are stacked on each other. As a result, it is possible to suppress displacement of a plurality of terminal units in a direction intersecting the stacking direction when molding the connector housing.

Eighth Aspect

In an eighth aspect, the molded connector according to any one of the first to the seventh aspect further include a third terminal unit that includes a third connector terminal and a third holder that holds the third connector terminal, and is stacked between the first terminal unit and the second terminal; and a third wire connected to the third connector terminal, in which the third terminal unit and an end portion of the third wire may be the insert parts of the connector housing. As a result, the terminal units and the wires can constitute three layers or more.

Details of Embodiments of the Present Disclosure

Specific examples of a molded connector according to the present disclosure will be described below with reference to the drawings. Note that the present disclosure is not limited to these examples, and is defined by the claims, and all changes that come within the meaning and range of equivalency of the claims are intended to be embraced therein.

Embodiment 1

Figure 2:
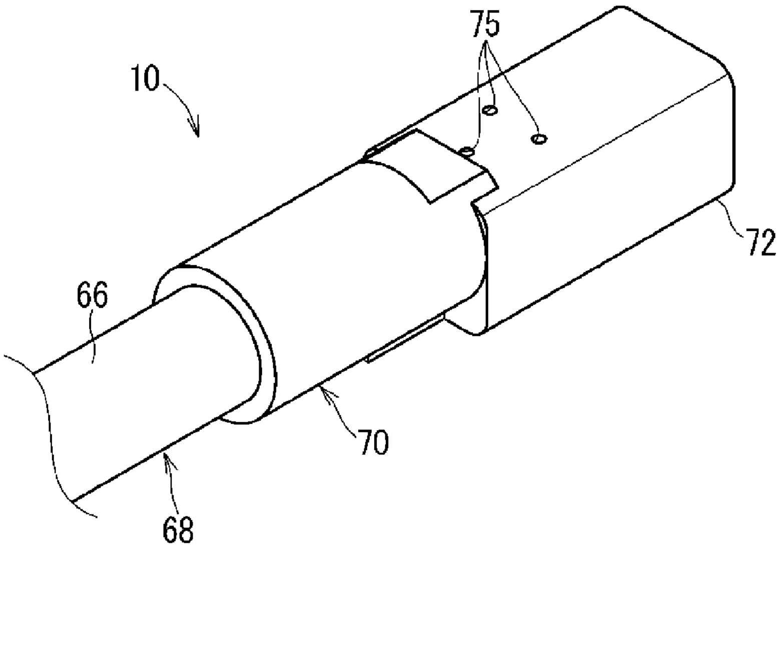
FIG. 2 is a perspective view showing a molded connector according to Embodiment 1.
Figure 3:
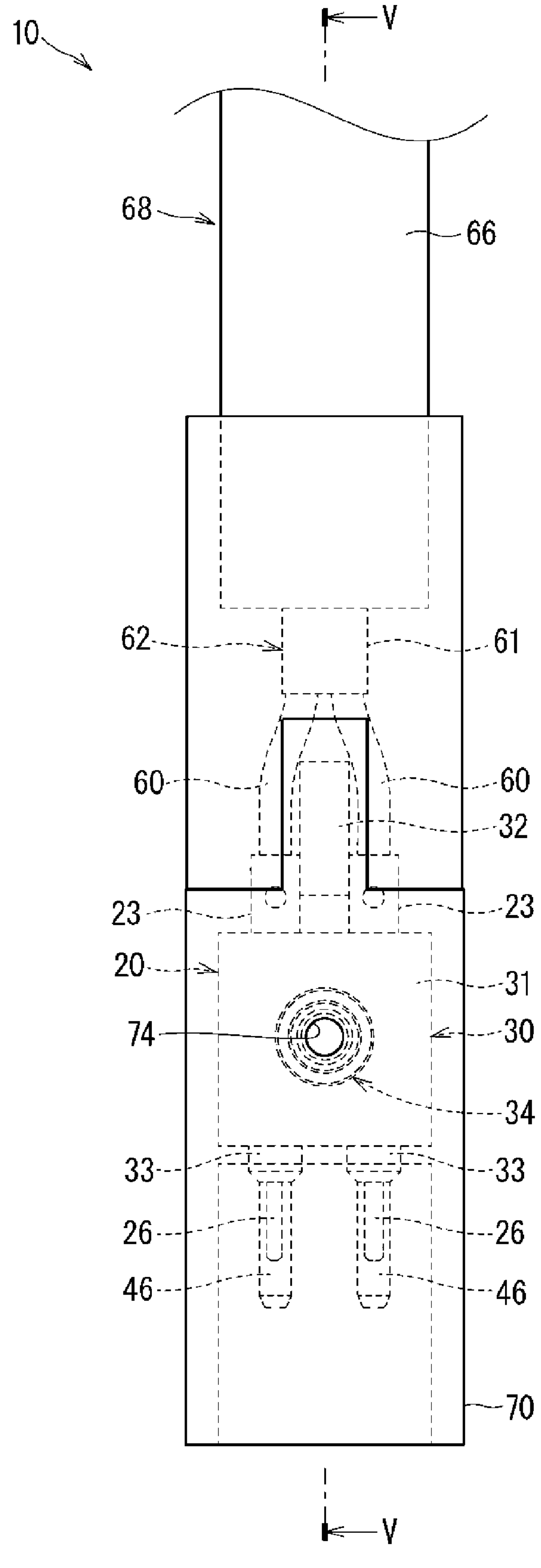
FIG. 3 is a plan view showing the molded connector according to Embodiment 1.
Figure 4:
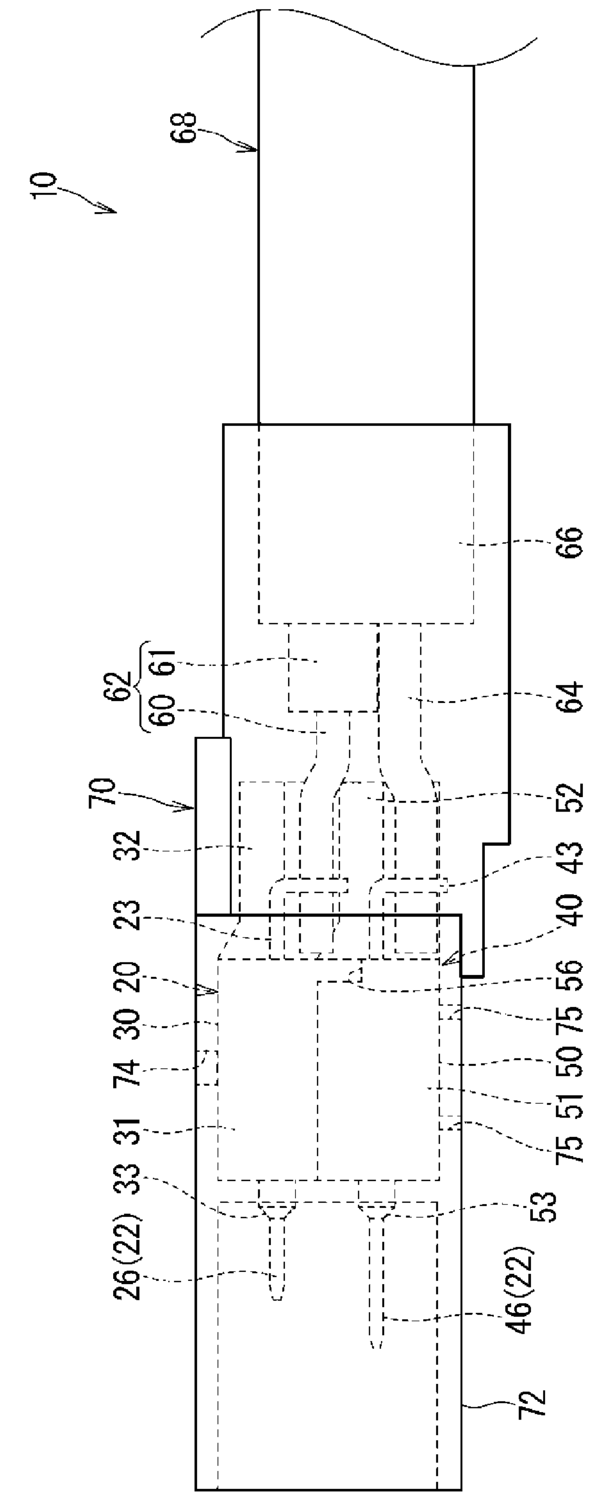
FIG. 4 is a side view showing the molded connector according to Embodiment 1.
Figure 5:
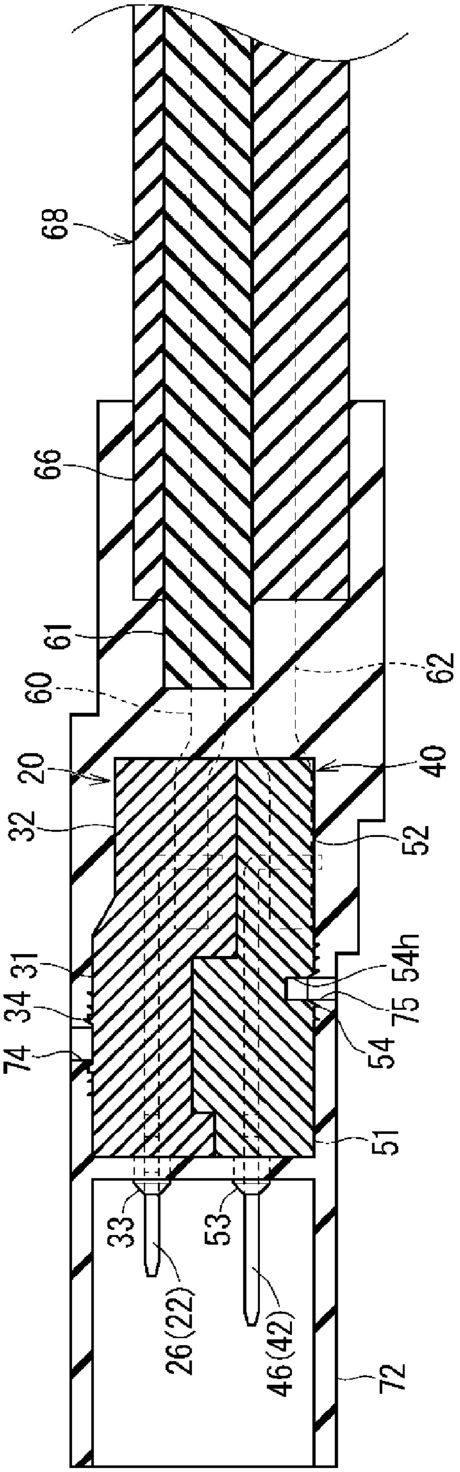
FIG. 5 is a cross-sectional view taken along line V-V in FIG. 3.

A molded connector according to Embodiment 1 will be described hereinafter. FIGS. 1 and 2 are perspective views showing a molded connector 10 according to Embodiment 1. FIGS. 1 and 2 show the molded connector 10 as seen from opposite directions. FIG. 3 is a plan view showing the molded connector 10 according to Embodiment 1. FIG. 4 is a side view showing the molded connector according to Embodiment 1. FIG. 5 is a cross-sectional view taken along line V-V in FIG. 3.

The molded connector 10 includes a first terminal unit 20, a second terminal unit 40, a first wire 60, a second wire 64, and a connector housing 70. The connector housing 70 is formed through insert molding, using the first terminal unit 20, the second terminal unit 40, an end portion of the first wire 60, and an end portion of the second wire 64 as insert parts. The first terminal unit 20 and the second terminal unit 40 are stacked on each other in the molded connector 10. Hereinafter, a direction in which the first terminal unit 20 and the second terminal unit 40 are stacked on each other may simply be referred to as a "stacking direction". The first terminal unit 20 and the second terminal unit 40 are provided with locking portions. The locking portions position the first terminal unit 20 and the second terminal unit 40 in a direction intersecting the stacking direction when molding the connector housing 70.

Figure 6:
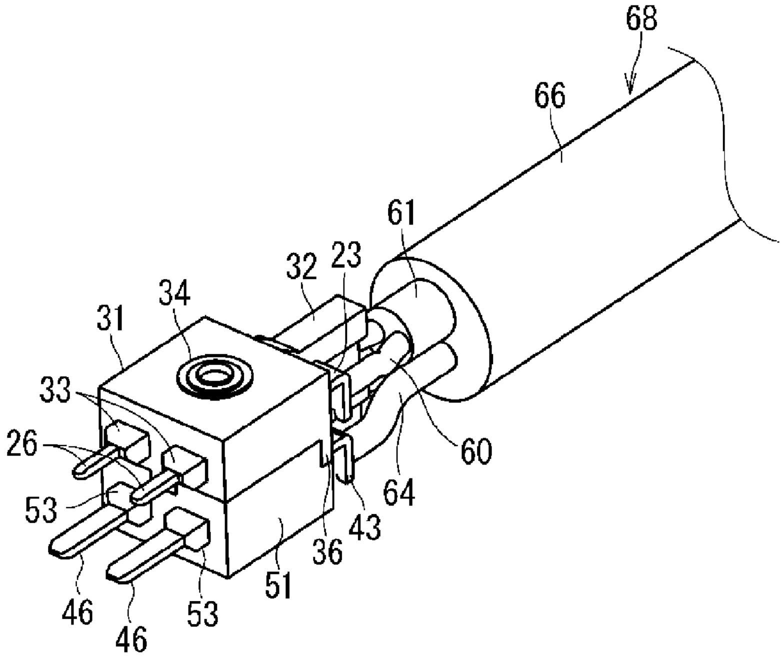
FIG. 6 is a perspective view showing an insert part.
Figure 7:
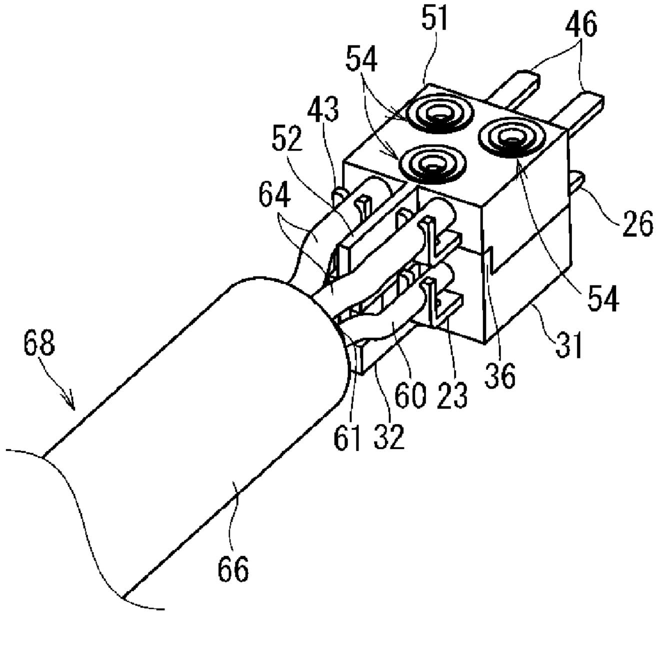
FIG. 7 is a perspective view showing an insert part.
Figure 8:
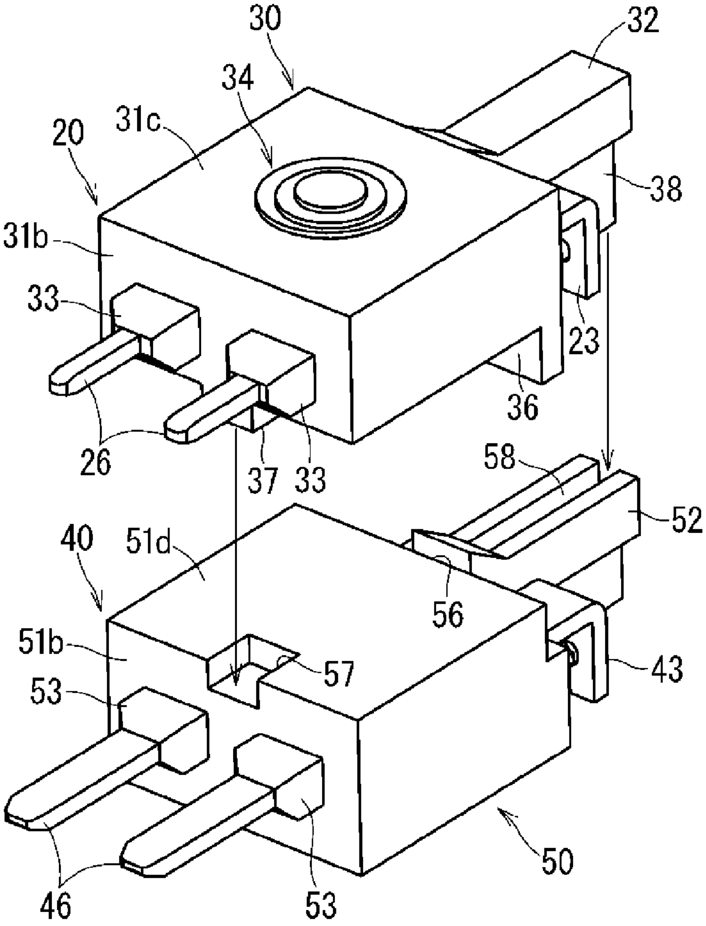
FIG. 8 is an exploded perspective view showing a first terminal unit and a second terminal unit.
Figure 9:
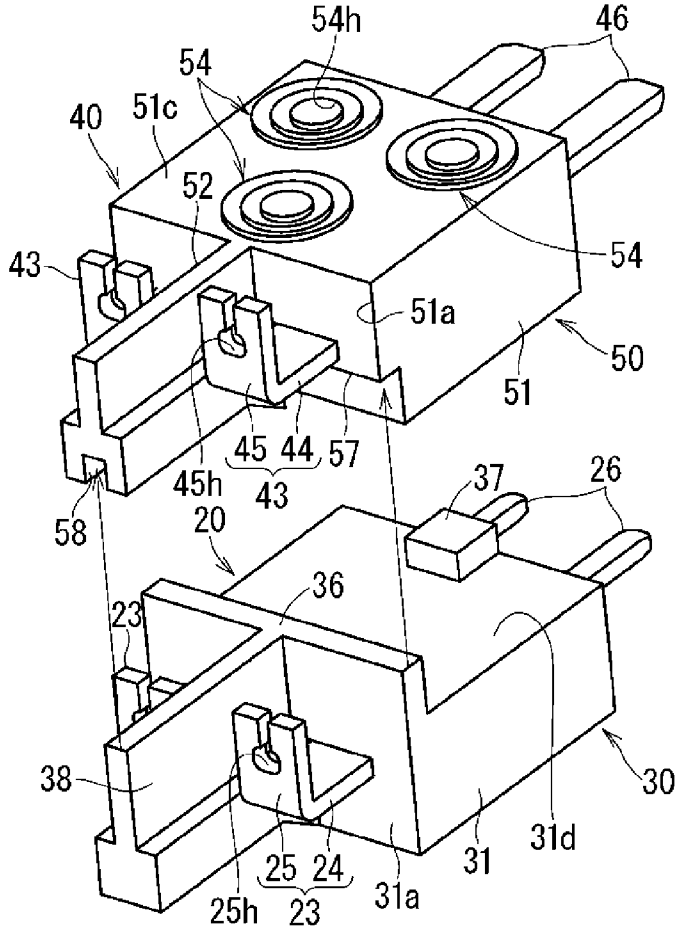
FIG. 9 is an exploded perspective view showing the first terminal unit and the second terminal unit.

The first terminal unit 20, the second terminal unit 40, the first wire 60, and the second wire 64, which serve as insert parts when molding the connector housing 70, will be described with reference to FIGS. 6 to 9, in addition to FIGS. 1 to 5. FIGS. 6 and 7 are perspective views showing an insert part. FIGS. 8 and 9 are exploded perspective views showing the first terminal unit 20 and the second terminal unit 40. FIGS. 6 and 8 are diagrams as seen from a similar direction to that in FIG. 1, and FIGS. 7 and 9 are diagrams as seen from a similar direction to that in FIG. 2.

The first terminal unit 20 includes a first connector terminal 22 and a first holder 30. The first holder 30 holds the first connector terminal 22 in a predetermined orientation. The first terminal unit 20 is formed by subjecting the first holder 30 to insert molding using the first connector terminal 22 as an insert part. In this embodiment, two first connector terminals 22 are provided. The two first connector terminals 22 are held by one first holder 30 in a state in which the two first connector terminals 22 are arranged side-by-side. The two first connector terminals 22 are arranged side-by-side in a direction intersecting the stacking direction.

Each first connector terminal 22 includes a first wire connecting portion 23 and a first contact portion 26. The first connector terminal 22 is formed in a shape in which a plate-shaped conductor is bent, for example. The first connector terminal 22 is formed in a shape in which a plate-shaped conductor is bent in an L-shape, for example. One end portion of the first connector terminal 22 serves as the first wire connecting portion 23, and the other end portion serves as the first contact portion 26. The first connecting portion 23 and the first contact portion 26 protrude from the first holder 30 in directions opposite to each other. An intermediate portion between the first wire connecting portion 23 and the first contact portion 26 of the first connector terminal 22 is embedded in the first holder 30.

The first wire connecting portion 23 is a portion connected to the first wire 60. The first wire connecting portion 23 is a portion that includes a corner portion of the L-shaped first connector terminal 22. Connection between the first wire connecting portion 23 and the core wire of the first wire 60 may take any form, and welding, crimping, or the like may be used, for example. The first wire connecting portion 23 has a first bottom plate 24. The first bottom plate 24 is a portion protruding from the first holder 30. The core wire of the first wire 60 is welded and connected to the first bottom plate 24, for example. Here, the first wire connecting portion 23 further includes a first wire support portion 25. The first wire support portion 25 protrudes from a leading end of the first bottom plate 24 in the height direction of the first bottom plate 24. The first wire support portion 25 is provided with a slit **25*h* that is recessed from a leading end portion toward a base end portion of the first wire support portion 25 in a direction in which the first wire support portion 25 protrudes from the first bottom plate 24. As a result of the first wire 60 fitting into the slit 25*h*, the first wire 60 is supported by the first wire support portion 25. Preferably, an opening portion of the slit 25***h* is narrower than a bottom portion of the slit 25*h*, for example.

The first contact portion 26 is a portion connected to a counterpart conductor. Here, the first contact portion 26 has the shape of a male terminal having a pin portion or a tab portion. The pin portion or the tab portion can be inserted into and connected to a tubular portion of a counterpart conductor formed in the shape of a female terminal (not shown), for example.

The first holder 30 includes a first main body portion 31, a first partition portion 32, a first protruding portion 33, a first annular rib 34, and locking protrusions 36, 37, and 38. The first main body portion 31 is a portion that holds the first connector terminals 22. The first main body portion 31 is formed in a columnar shape such as a rectangular parallelepiped shape or a hexagonal columnar shape, for example. The first wire connecting portions 23 protrude outward from one surface (referred to as "one protruding face 31*a*" hereinafter) of the first main body portion 31. The first contact portions 26 protrude outward from a surface (referred to as the "other protruding face 31*b*" hereinafter) of the first main body portion 31 on the side opposite to the one protruding face 31*a*.

The first partition portion 32 is provided protruding from the one protruding face 31*a* of the first main body portion 31. The first partition portion 32 extends parallel to the two first connector terminals 22, and partitions the space between the two first connector terminals 22 (the space between two first wire connecting portions 23). Here, the length by which the first partition portion 32 protrudes from the one protruding face 31*a* is larger than the length by which the first connector terminal 22 protrudes from the one protruding face 31*a*. As a result, the first partition portion 32 can also partition the space between two first wires 60 respectively connected to the two first wire connecting portions 23.

The first protruding portions 33 are provided protruding from the other protruding face 31*b* of the first main body portion 31. The length by which the first protruding portion 33 protrudes from the other protruding face 31*b* is smaller than the length by which the first connector terminal 22 protrudes from the other protruding face 31*b*. The first protruding portions 33 are respectively provided around the two first connector terminals 22. Each first protruding portion 33 covers a base end portion of a portion of the corresponding first connector terminal 22 that protrudes from the other protruding face 31*b*, and the first protruding portion 33 is covered by the connector housing 70.

The first annular rib 34 is provided on a surface (referred to as one main face 31*c* hereinafter) of the first main body portion 31 on the side opposite to the second terminal unit 40, the surface being oriented in the stacking direction. A later-described hole 74 of the connector housing 70 is present in a central portion of the first annular rib 34, and a resin material that constitutes the connector housing 70 is not provided therein. Here, three annular ribs having different sizes are concentrically provided at one position on the one main face 31*c* to form the first annular rib 34. Also, the first annular rib 34 has a circular protruding shape. Naturally, the number and the shape of the first annular rib 34 are not limited to those described above, and can be set as appropriate. The first annular rib 34 may also be provided with only one or two annular ribs, for example. Also, the first annular rib 34 may also be formed in the shape of a polygonal protrusion or the like, for example.

The locking protrusions 36, 37, and 38 are parts of a locking portion for maintaining a state in which the two terminal units 20 and 40 are stacked on each other. The locking protrusions 36, 37, and 38 are respectively fitted to later-described corresponding locking recesses 56, 57, and 58 of the second terminal unit 40.

The locking protrusion 36 is provided such that a portion of the first main body portion 31 that includes an edge between a surface (the other main face 31*d* hereinafter) on the side opposite to the one main face 31*c* and the one protruding face 31*a* protrudes to the second terminal unit 40 side. The locking protrusion 36 extends in a flat plate shape over the entire width direction of the first main body portion 31. The locking protrusion 36 is fitted to the locking recess 56.

The locking protrusion 37 is provided such that a portion of the first main body portion 31 that includes an edge between the other protruding face 31*b* and the other main face 31*d* protrudes to the second terminal unit 40 side. The locking protrusion 37 is provided at the position of an intermediate portion in the width direction of the first main body portion 31 (a position between two first protruding portions 33 in this embodiment) such that the locking protrusion 37 forms a partial rectangular parallelepiped. The locking protrusion 37 is fitted to the locking recess 57.

The locking protrusion 38 is provided on a portion of the first partition portion 32 facing the second terminal unit 40. The locking protrusion 38 is fitted to the locking recess 58. The locking protrusion 38 is provided with a portion whose width gradually increases from a leading end portion to an intermediate portion along the direction in which the locking protrusion 38 protrudes from the one protruding face 31*a*.

The second terminal unit 40 includes a second connector terminal 42 and a second holder 50. The second holder 50 holds the second connector terminal 42 in a predetermined orientation. The second terminal unit 40 is formed by subjecting the second holder 50 to insert molding using the second connector terminal 42 as an insert part. Here, two second connector terminals 42 are provided. The two second connector terminals 42 are held by one second holder 50 in a state in which the two second connector terminals 42 are arranged side-by-side. The two second connector terminals 42 are arranged side-by-side in a direction intersecting the stacking direction. The direction in which the first connector terminals 22 are arranged parallel to each other is parallel to the direction in which the second connector terminals 42 are arranged parallel to each other.

Each second connector terminal 42 includes a second wire connecting portion 43 and a second contact portion 46. The second connector terminal 42 is formed in a shape in which a plate-shaped conductor is bent, for example. The second connector terminal 42 is formed in a shape in which a plate-shaped conductor is bent in an L-shape, for example. One end portion of the second connector terminal 42 serves as the second wire connecting portion 43, and the other end portion serves as the second contact portion 46. The second wire connecting portion 43 and the second contact portion 46 protrude from the second holder 50 in directions opposite to each other. An intermediate portion between the second wire connecting portion 43 and the second contact portion 46 of the second connector terminal 42 is embedded in the second holder 50.

The second wire connecting portion 43 is a portion connected to the second wire 64. The second wire connecting portion 43 is a portion that includes a corner portion of the L-shaped second connector terminal 42. Connection between the second wire connecting portion 43 and the core wire of the second wire 64 may take any form, and welding, crimping, or the like may be used, for example. The second wire connecting portion 43 has a second bottom plate 44.

The second bottom plate 44 is a portion protruding from the second holder 50. The core wire of the second wire 64 is welded and connected to the second bottom plate 44, for example. Here, the second wire connecting portion 43 further includes a second wire support portion 45. The second wire support portion 45 protrudes from a leading end of the second bottom plate 44 in the height direction of the second bottom plate 44. The second wire support portion 45 is provided with a slit 45*h* recessed from a leading end portion toward a base end portion of the second wire support portion 45 in a direction in which the second wire support portion 45 protrudes from the second bottom plate 44. As a result of the second wire 64 fitting into the slit 45*h*, the second wire 64 is supported by the second wire support portion 45. Preferably, an opening portion of the slit 45*h* is narrower than a bottom portion of the slit 45*h*, for example.

The second contact portion 46 is a portion connected to a counterpart conductor. Here, the second contact portion 46 has the shape of a male terminal having a pin portion or a tab portion. The pin portion or the tab portion can be inserted into and connected to a tubular portion of a counterpart conductor formed in the shape of a female terminal (not shown), for example.

The second holder 50 includes a second main body portion 51, a second partition portion 52, second protruding portions 53, second annular ribs 54 and 55, and the locking recesses 56, 57, and 58. The second main body portion 51 is a portion that holds the second connector terminals 42. The second main body portion 51 is formed in a columnar shape such as a rectangular parallelepiped shape or a hexagonal columnar shape, for example. The second wire connecting portions 43 protrude outward from one surface (referred to as one protruding face 51*a* hereinafter) of the second main body portion 51. The second contact portions 46 protrude outward from a surface (referred to as the other protruding face 51*a* hereinafter) of the second main body portion 51 on the side opposite to the one protruding face 51*b*.

The second partition portion 52 is provided protruding from the one protruding face 51*a* of the second main body portion 51. The second partition portion 52 extends parallel to the two second connector terminals 42, and partitions the space between the two second connector terminals 42 (the space between two second wire connecting portions 43). Here, the length by which the second partition portion 52 protrudes from the one protruding face 51*a* is larger than the length by which the second connector terminal 42 protrudes from the one protruding face 51*a*. As a result, the second partition portion 52 can also partition the space between two second wires 64 respectively connected to the two second wire connecting portions 43.

The second protruding portions 53 are provided protruding from the other protruding face 51*b* of the second main body portion 51. The length by which each second protruding portion 53 protrudes from the other protruding face 51*b* is smaller than the length by which the second connector terminal 42 protrudes from the other protruding face 51*b*. The second protruding portions 53 are respectively provided around the two second connector terminals 42. Each second protruding portion 53 covers a base end portion of a portion of the corresponding second connector terminal 42 that protrudes from the other protruding face 51*b*, and the second protruding portions 53 are covered by the connector housing 70.

The second annular ribs 54 are provided on a surface (referred to as one main face 51*c* hereinafter) of the second main body portion 51 on the side opposite to the first terminal unit 20, the surface being oriented in the stacking direction. A later-described hole 75 of the connector housing 70 is present in a central portion of each second annular rib 54, and a resin material that constitutes the connector housing 70 is not provided therein. Here, three annular ribs having different sizes are concentrically provided at three positions on the one main face 51*c*, respectively, to form the second annular ribs 54. Also, the second annular ribs 54 have a circular protruding shape. Naturally, the number and the shape of the second annular ribs 54 are not limited to those described above, and can be set as appropriate. Each second annular rib 54 may also be provided with only one or two annular ribs, for example. A second annular rib 54 may also be provided at one position on the one main face 51*c*, for example. Also, the second annular ribs 54 may also be formed in the shape of a polygonal protrusion or the like, for example.

The second annular rib 55 is provided on a surface (referred to as the other main face 51*d* hereinafter) of the second main body portion 51 facing the first terminal unit 20, the surface being oriented in the stacking direction. Similarly to the first annular rib 34, three second annular ribs having different sizes are concentrically provided at one position on the other main face 51*d* to form the second annular rib 55. The annular rib 55 has a circular protruding shape. The annular rib 55 may also be formed in the shape of a polygonal protrusion or the like.

It is preferable that the annular ribs 34, 54, and 55 are formed such that the widths thereof decrease toward the leading end side in the protruding direction. Here, a bottomed hole 54*h* having a bottom is formed at the center of each second annular rib 54 on the one main face 51*c* of the second main body portion 51 of the second holder 50. The bottomed-hole 54*h* is sized such that a positioning pin can be fitted thereto when molding the connector housing 70. When the positioning pin is fitted to each bottomed-hole 54*h*, the second holder 50 can be more accurately positioned when the connector housing 70 is molded using a mold. Note that the bottomed-holes 54*h* need not be formed in the second holder 50.

The locking recesses 56, 57, and 58 are parts of a locking portion for maintaining a state in which the two terminal units 20 and 40 are stacked on each other. The locking protrusions 36, 37, and 38 provided on the first terminal unit 20 are respectively fitted to the corresponding locking recesses 56, 57, and 58.

The locking recess 56 is provided such that a portion of the second main body portion 51 that includes an edge between the one protruding face 51*a* and the other main face 51*d* is recessed to the side opposite to the first terminal unit 20 side. The locking recess 56 is recessed over the entire width direction of the second main body portion 51. When the locking protrusion 36 is fitted to the locking recess 56 as described above, the two terminal units 20 and 40 are positioned in the longitudinal direction of the connector terminals 22 and 42. The locking protrusion 36 that is fitted to the locking recess 56 is positioned between the second main body portion 51 and the second partition portion 52 in the longitudinal direction of the connector terminals 22 and 42. As a result, the two terminal units 20 and 40 are positioned in two directions along the longitudinal direction of the connector terminals 22 and 42.

The locking recess 57 is provided such that a portion of the second main body portion 51 that includes an edge between the other protruding face 51*b* and the other main face 51*d* is recessed to the side opposite to the first terminal unit 20 side. The locking recess 57 is partially recessed in a rectangular parallelepiped and provided at the position of an intermediate portion in the width direction of the second main body portion 51 (a position between two second protruding portions 53 here). When the locking protrusion 37 is fitted to the locking recess 57 as described above, the two terminal units 20 and 40 are positioned in one direction of the longitudinal direction of the connector terminals 22 and 42 and two directions in the direction where the connector terminals 22 and 42 are arranged side-by-side.

The locking recess 58 is provided such that a portion of the second partition portion 52 facing the first terminal unit 20 is recessed toward the side opposite to the first terminal unit 20 side. When the locking protrusion 38 is fitted to the locking recess 58 as described above, the two terminal units 20 and 40 are positioned in two directions in the direction where the connector terminals 22 and 42 are arranged side-by-side. Here, the locking recess 58 is formed in the shape of a groove having a constant width and extending in the longitudinal direction. The width of a portion of the locking protrusion 38 may be larger than the width of the locking recess 58, for example. Accordingly, the locking protrusion 38 can be press-fitted into the locking recess 58.

The first wire 60 is connected to the first connector terminal 22. The first wire 60 is a coated wire that includes a core wire and a coating layer. The core wire is a twisted wire formed by twisting a plurality of strands together, for example. The coating layer covers the core wire. The coating layer is formed by extruding an insulating material such as resin around the core wire, for example. The coating layer is stripped off from an end portion of the first wire 60 to expose the core wire. Then, the exposed core wire is connected to the first wire connecting portion 23.

The second wire 64 is connected to the second connector terminal 42. The second wire 64 includes a core wire and a coating layer. The core wire is a twisted wire formed by twisting a plurality of strands together, for example. The coating layer covers the core wire. The coating layer is formed by extruding an insulating material such as resin around the core wire, for example. The coating layer is stripped off from an end portion of the second wire 64 to expose the core wire. Then, the exposed core wire is connected to the second wire connecting portion 43.

Here, a description will be given presuming that the first wire 60 is a signal wire, and the second wire 64 is a power wire. The first wire 60 may be used as a signal wire for transmitting signals from a sensor for detecting a wheel speed in an ABS (Anti-Lock Brake System), for example. The second wire 64 may be used as a power wire for supplying power to an EPB (Electric Parking Brake) or EMB (Electro-Mechanical Brake) system, for example. Also, a description will be given presuming that the second wire 64 is thicker than the first wire 60. This is because the second wire 64 serving as a power wire can handle a current larger than a current that can be handled by the first wire 60 serving as a signal wire.

Here, two first wires 60 are covered by a sheath 61, and the resulting cable is treated as one cable 62. The sheath 61 is formed by extruding an insulating material such as resin around the two first wires 60, for example.

Further, three wire members, i.e., the one cable 62 and two second wires 64, are covered by a sheath 66, and the resulting cable is treated as one cable 68. The sheath 66 is formed by extruding an insulating material such as resin around the three wire members, for example. The sheath 66 is an example of a sheath covering the first wires 60 and the second wires 64.

When the sheaths 61 and 66 constitute two layers in this manner, the sheath 61 on the inner side may be referred to as an inner sheath 61, and the sheath 66 on the outer side may be referred to as an outer sheath 66. Note that one or both of the two sheaths 61 and 66 may be omitted.

The two first wires 60 extend from an end portion of the inner sheath 61 and an end portion of the outer sheath 66, and are connected to the first connector terminals 22. The two second wires 64 extend from an end portion of the outer sheath 66, and are connected to the second connector terminals 42. Note that an end portion of the inner sheath 61 is located on the first connector terminal 22 side relative to the end portion of the outer sheath 66 here. That is, the inner sheath 61 extends from the end portion of the outer sheath 66. Alternatively, the end portion of the inner sheath 61 may be located at the same position as the end portion of the outer sheath 66.

With regard to the first wires 60, the coating layer is stripped off from the leading end side relative to the position of the end portion of the inner sheath 61. At this time, an end portion of the coating layer of each first wire 60 may be located at the same position as the end portion of the inner sheath 61, or may also be located on the leading end side relative to the end portion of the inner sheath 61. The end portion of the coating layer of each first wire 60 may also be located at the same position as a leading end portion of the first partition portion 32 in a direction in which the first partition portion 32 protrudes, or may also be located on the first main body portion 31 side relative to the same position as the leading end portion of the first partition portion 32. Portions of the first wires 60 having the coating layer may be partitioned by the first partition portion 32.

With regard to each second wire 64, the coating layer is stripped off from the leading end side relative to the position of the end portion of the outer sheath 66. At this time, an end portion of the coating layer of the second wire 64 may be located at the same position as the end portion of the outer sheath 66, or may also be located on the leading end side relative to the end portion of the outer sheath 66. An end portion of the coating layer of the second wire 64 may also be located at the same position as a leading end portion of the second partition portion 52 in a direction in which the second partition portion 52 protrudes, or may also be located on the second main body portion 51 side relative to the same position as the leading end portion of the second partition portion 52. Portions of the second wires 64 having the coating layer may be partitioned by the second partition portion 52.

Here, because one of the first bottom plate 24 and the second bottom plate 44 (the second bottom plate 44 in this embodiment) is located between the first wire 60 and the second wire 64, short circuiting between the first wire 60 and the second wire 64 is suppressed. More specifically, the first wire 60 and the second wire 64 can be more easily bent compared to the first connector terminal 22 and the second connector terminal 42. When the first connector terminal 22 and the second connector terminal 42 are positioned, a portion therebetween is likely to maintain a certain shape due to its rigidity. Even when the first wire 60 and the second wire 64 are positioned, it is difficult for a portion therebetween to maintain a certain shape due to its rigidity. In view of this, by interposing one of the first bottom plate 24 and the second bottom plate 44 between the core wire of the first wire 60 and the core wire of the second wire 64, short circuiting between the core wire of the first wire 60 and the core wire of the second wire 64 can be easily suppressed.

The connector housing 70 covers the first terminal unit 20, the second terminal unit 40, the end portions of the first wires 60, and the end portions of the second wires 64 while the first contact portions 26 of the first connector terminals 22 and the second contact portions 46 of the second connector terminals 42 are exposed. At this time, the connector housing 70 covers the sheath 66 to the end portion thereof. The first wires 60 and the second wires 64 extend from the end portion of the sheath 66 in the connector housing 70.

An outer surface of a portion of the connector housing 70 that covers the first holder 30 and the second holder 50 is formed in a quadrangular shape. An outer surface of a portion of the connector housing 70 that covers the sheath 66 is formed in a circular shape.

A portion of the connector housing 70 that covers the first contact portions 26 and the second contact portions 46 is a hollow hood portion 72. The other protruding face 31*b* of the first holder 30 and the other protruding face 51*b* of the second holder 50 are covered by the connector housing 70, and are not exposed inside the hood portion 72. The first protruding portion 33 of the first holder 30 and the leading end portion of the second protruding portion 53 of the second holder 50 are not covered by the connector housing 70, and are exposed inside the hood portion 72.

The holes 74 and 75, which are recessed in the direction in which the first terminal unit 20 and the second terminal unit 40 are stacked on each other, are formed in portions of the connector housing 70 that cover the first holder 30 and the second holder 50. The holes 74 and 75 are provided at positions on both the one main face and the other main face of the connector housing 70, the positions corresponding to the centers of the annular ribs 34 and 54. The holes 74 and 75 extend to the first holder 30 and the second holder 50.

One hole 74 is provided in the one main face of the connector housing 70, and three holes 75 are provided in the other main face of the connector housing 70. The center of the one hole 74 is located inside a triangle formed by connecting the centers of the three holes 75 in a plan view, for example. Positioning pins of a mold are placed in these holes 74 and 75 when the connector housing 70 is to be molded.

More specifically, when the connector housing 70 is to be molded with a mold using the first terminal unit 20, the second terminal unit 40, the first wires 60, and the second wires 64 as insert parts, the positioning pins are inserted to the portions corresponding to the holes 74 and 75, resulting in a state in which the positioning pins are in contact with the surfaces of the first holder 30 and the second holder 50. As a result, the connector housing 70 is molded with a mold in a state in which the first terminal unit 20 and the second terminal unit 40 are positioned in a mold device. Thus, the first terminal unit 20 and the second terminal unit 40 are accurately held at certain positions with respect to the connector housing 70. The leading end portions of the first wires 60 and the leading end portions of the second wires 64 that are respectively connected to the first terminal unit 20 and the second terminal unit 40 are also accurately held at certain positions with respect to the connector housing 70.

When the connector housing 70 is to be molded with a mold, a heat-melted resin is injected into the mold. When the heat-melted resin comes into contact with the surface of an insert part, the resin rapidly cools and is solidified. At leading end portions of the annular ribs 34, 54, and 55 (referred to as the annular rib 34 and the like, hereinafter), the heat-melted resin does not cool as rapidly as when the resin comes into contact with a flat surface of an insert part. Thus, a heat-melted resin for forming the connector housing 70 can fuse with the leading end portion of the annular rib 34 and the like. That is, when the connector housing 70 is molded with a mold, using the first terminal unit 20 as an insert part, an interface may be formed at the boundary between a wide and flat surface of the insert part and the connector housing 70. However, a portion where the resin forming a terminal unit and the resin forming the connector housing 70 are fused together and integrated with each other is likely to be formed at the leading end portion of the annular rib 34 and the like. In particular, when the annular rib 34 and the like are formed such that the width thereof decreases toward the leading end side in the protruding direction, the leading end portion of the annular rib 34 and the like is likely to melt into the resin forming the connector housing 70. Thus, more complete liquid-sealing is realized along the annular rib 34 and the like at the boundaries between the terminal units 20 and 40 and the connector housing 70. Such an annular rib 34 and the like may be referred to as a melt rib. It is preferable that the holders 30 and 50 and the connector housing 70 are formed of the same material such that the annular rib 34 and the like and the connector housing 70 can be easily fused together. Note that there is no particular limitation on the material constituting the holders 30 and 50 and the connector housing 70, and an insulating resin material such as PBT (polybutylene terephthalate), polyamide, or PE (polyethylene) can be used, for example.

In particular, when the above positioning holes 74 and 75 are provided, the boundaries between the holders 30 and 50 and the connector housing 70 are exposed to the outside through the holes 74 and 75. In view of this, the annular ribs 34 and 54 are formed to surround the holes 74 and 75. This inhibits water from moving between the holders 30 and 50 and the connector housing 70 through the holes 74 and 75.

Effects of Embodiment 1

According to the molded connector 10 configured as described above, as a result of the connector housing 70 being formed through insert molding, using the first terminal unit 20, the second terminal unit 40, the end portions of the first wires 60, and the end portions of the second wires 64, as insert parts, the waterproofness of the connector 10 can be enhanced.

Also, the connector housing 70 covers the end portion of the sheath 66. As a result, it is possible to inhibit water from entering the sheath 66 from the end portion of the sheath 66.

Also, the terminal units 20 and 40 are formed by subjecting the holders 30 and 50 to insert molding using the connector terminals 22 and 42 as insert parts. As a result, it is possible to reduce the size of gaps between the connector terminals 22 and 42 and the holders 30 and 50 of the terminal units 20 and 40, thus enhancing the waterproofness of the molded connector 10.

Also, the wire connecting portions 23 and 43 of the connector terminals 22 and 42 that are respectively connected to the wires 60 and 64 protrude outward of the holders 30 and 50. As a result, it is possible to easily connect the wires 60 and 64 to the corresponding connector terminals 22 and 42 after the terminal units 20 and 40 have been molded. In particular, in the case of the cable 68 provided with the sheath 66, if the first terminal unit 20 and the second terminal unit 40 are to be formed separately after the wires 60 and 64 have been connected to the corresponding connector terminals 22 and 42, the amount of the sheath 66 that is to be stripped off will increase.

Also, the second bottom plate 44 is present between the core wire of the first wire 60 and the core wire of the second wire 64. As a result, the core wire of the first wire 60 and the core wire of the second wire 64 can be partitioned by the highly rigid second bottom plate 44, thereby suppressing short circuiting between the core wires.

Further, the holes 74 and 75, which are recessed in the direction in which the first terminal unit 20 and the second terminal unit 40 are stacked on each other, are formed in portions of the connector housing 70 that cover the first holder 30 and the second holder 50. As a result, it is possible to position positioning pins in the positions of the holes 74 and 75 when molding the connector housing 70, and thus suppress displacement of a plurality of the terminal units 20 and 40 in the stacking direction when molding the connector housing 70.

Also, the first holder 30 and the second holder 50 are provided with the locking protrusions 36, 37, and 38 and the locking recesses 56, 57, and 58 that serve as locking portions for positioning the first terminal unit 20 and the second terminal unit 40 in a direction intersecting the stacking direction. As a result, it is possible to suppress displacement of the plurality of terminal units 20 and 40 in the direction intersecting the stacking direction when molding the connector housing 70.

Modification Examples of Embodiment 1

Figure 10:
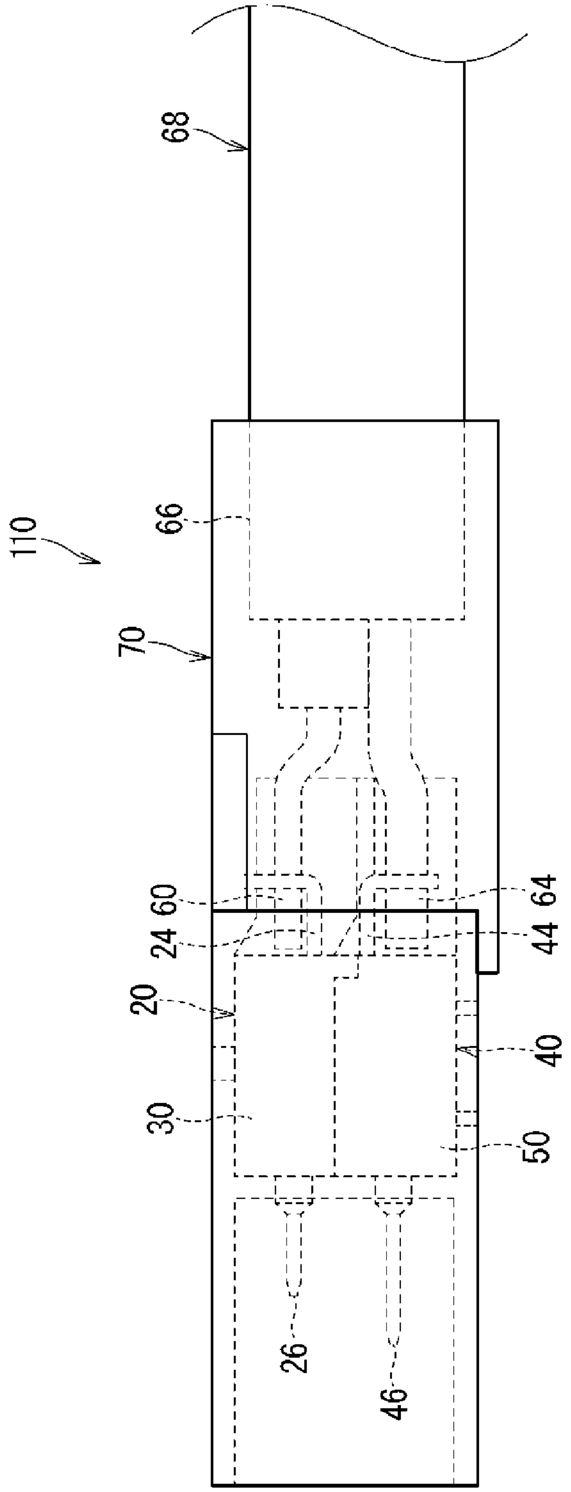
FIG. 10 is a side view showing a modification example of the molded connector according to Embodiment 1.

FIG. 10 is a side view showing a modification example of the molded connector 10 according to Embodiment 1.

In a molded connector 110 shown in FIG. 10, both the first bottom plate 24 and the second bottom plate 44 are present between the core wire of the first wire 60 and the core wire of the second wire 64. Note that, from the viewpoint of suppressing short circuiting between the core wire of the first wire 60 and the core wire of the second wire 64, at least one of the first bottom plate 24 and the second bottom plate 44 is preferably present therebetween, and both the first bottom plate 24 and the second bottom plate 44 are more preferably present therebetween as in the molded connector 110.

In addition, although a configuration was described above in which the connector housing 70 covers the sheath 66, this is not a required configuration. An end portion of the sheath 66 may be located at a part of the wires 60 and 64 that extends from the connector housing 70.

Further, a configuration was described above in which the terminal units 20 and 40 are formed by subjecting the holders 30 and 50 to insert molding using the connector terminals 22 and 42 as insert parts, but this is not a required configuration. A terminal unit may also be provided by inserting or mounting a connector terminal into/on a holder that is molded separately from the connector terminal.

Also, a configuration was described above in which, when the terminal units 20 and 40 are formed by subjecting the holders 30 and 50 to insert molding using the connector terminals 22 and 42 as insert parts, the wire connecting portions 23 and 43 and the contact portions 26 and 46 protrude outward of the holders 30 and 50 in the terminal units 20 and 40, but this configuration is not a required configuration. A wire connecting portion may be embedded in a holder in a terminal unit, for example. In this case, the holder is formed through insert molding using the wires and the connector terminals as insert parts in a state in which the wires are connected to the connector terminals.

Further, although a configuration was described above in which the holes 74 and 75, which are recessed in the direction in which the terminal units 20 and 40 are stacked on each other, are formed in portions of the connector housing 70 that cover the first holder 30 and the second holder 50, this is not a required configuration, and the holes 74 and 75 need not be formed. Also, although a configuration was described above in which, when the holes 74 and 75 are formed, the annular ribs 34 and 54 are provided around the holes 74 and 75, this is not a required configuration, and the annular ribs 34 and 54 need not be provided.

Also, although a configuration was described above in which the first holder 30 and the second holder 50 are provided with locking portions for positioning the first terminal unit 20 and the second terminal unit 40 in the direction intersecting the stacking direction, this configuration is not a required configuration, and a locking portion need not be provided. Further, even when a locking portion is provided, a configuration in which three sets of the locking protrusions 36, 37, and 38 and the locking recesses 56, 57, and 58 are provided as the locking portion is not a required configuration. A configuration may be adopted in which any one or two sets of the locking protrusions 36, 37, and 38 and the locking recesses 56, 57, and 58 are provided as the locking portions, for example.

Embodiment 2

Figure 11:
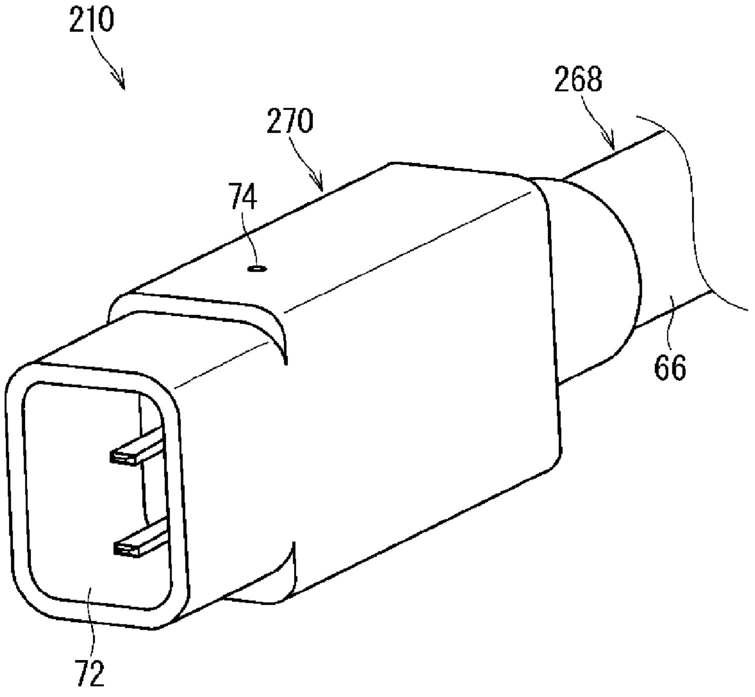
FIG. 11 is a perspective view showing a molded connector according to Embodiment 2.
Figure 12:
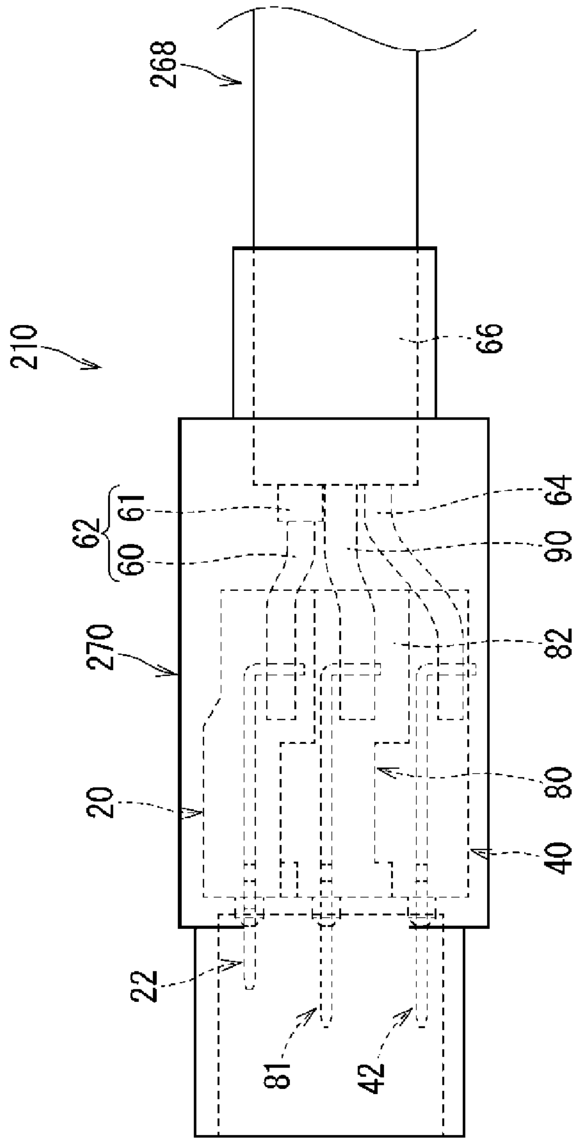
FIG. 12 is a side view showing the molded connector according to Embodiment 2.
Figure 13:
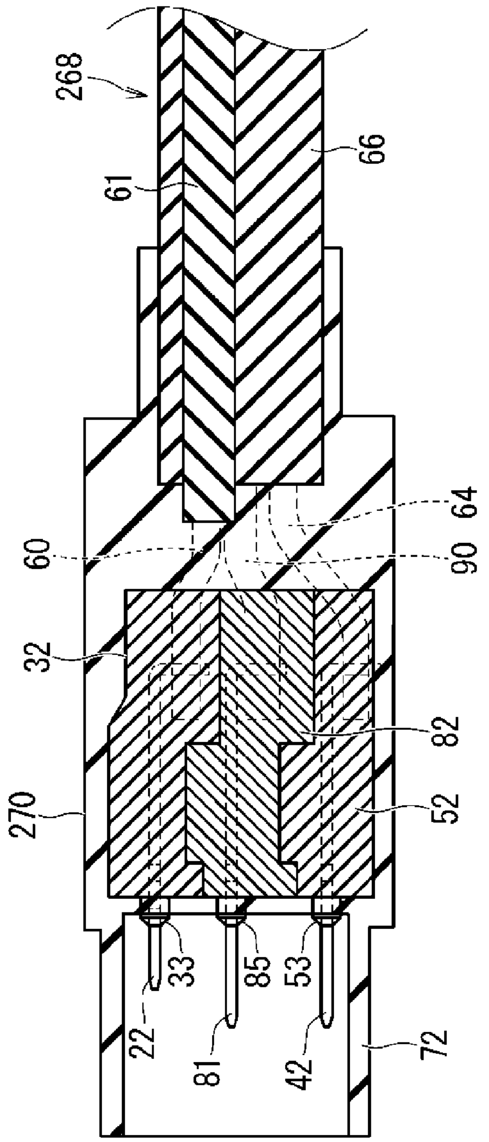
FIG. 13 is a schematic cross-sectional view showing the molded connector according to Embodiment 2.
Figure 14:
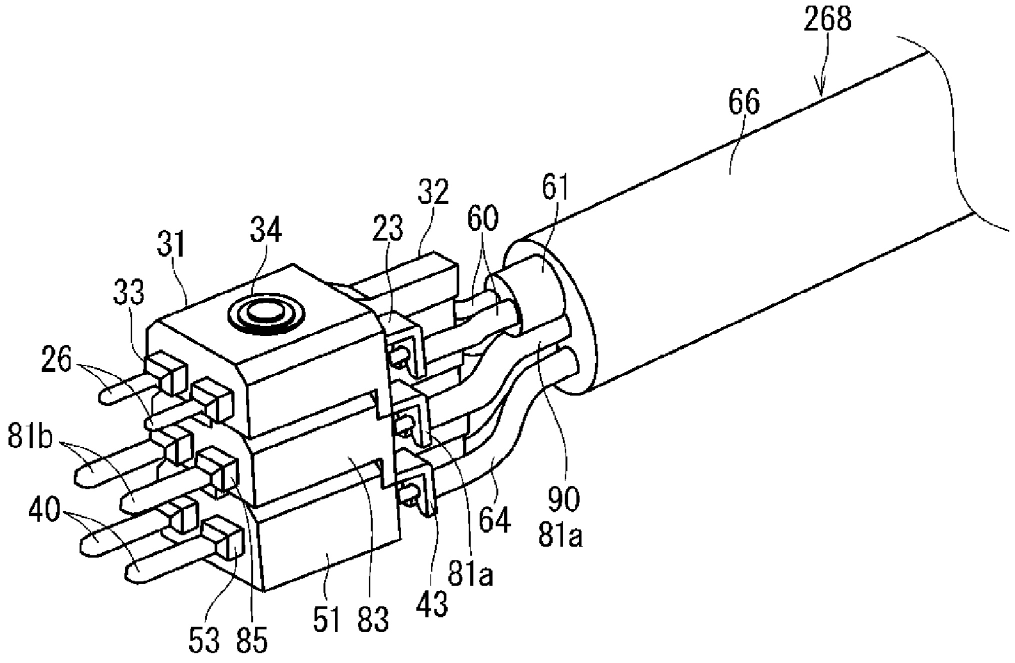
FIG. 14 is a perspective view showing an insert part.
Figure 15:
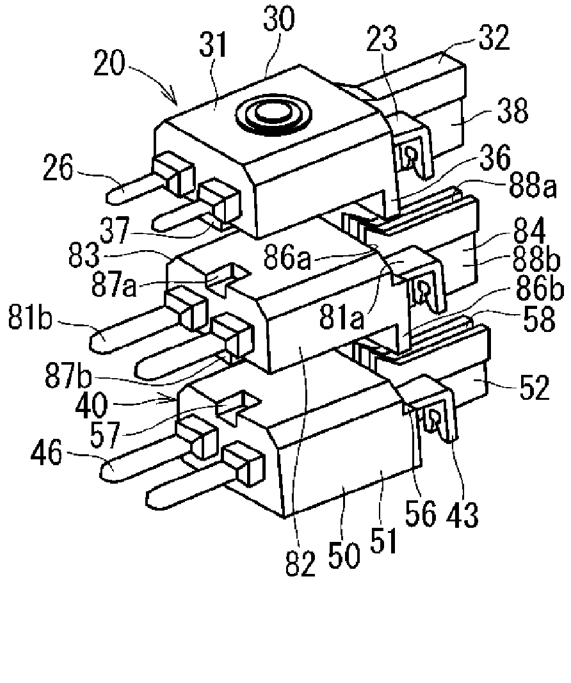
FIG. 15 is an exploded perspective view showing a first terminal unit, a second terminal unit, and a third terminal unit.

A molded connector according to Embodiment 2 will be described hereinafter. FIG. 11 is a perspective view showing a molded connector 210 according to Embodiment 2. FIG. 12 is a side view showing the molded connector 210 according to Embodiment 2. FIG. 13 is a schematic cross-sectional view showing the molded connector 210 according to Embodiment 2. Note that FIG. 13 is a cross-sectional view taken at a position similar to that in FIG. 5. Also, the annular ribs 34 and 54 and the holes 74 and 75 are not shown in FIG. 13. FIG. 14 is a perspective view showing an insert part. FIG. 15 is an exploded perspective view of a first terminal unit, a second terminal unit, and a third terminal unit 80. Note that constituent elements that are the same as those described thus far are given the same reference numerals, and are not described in the following description.

Although the terminal units 20 and 40 and the wires 60 and 64 constitute two layers in the molded connector 10 described in Embodiment 1, the terminal units and the wires may be in three or more layers. In the molded connector 210 of this example, the terminal units 20, 40 and 80, and the wires 62, 64, and 90 constitute three layers. The molded connector 210 further includes one third terminal unit 80 and two third wires 90.

The third terminal unit 80 is provided between the first terminal unit 20 and the second terminal unit 40. The third terminal unit 80 forms an intermediate layer in three or more terminal units 20, 40, and 80. The third terminal unit 80 includes a third connector terminal 81 and a third holder 82.

The third connector terminal 81 has a shape similar to that of the first connector terminal 22 and the second connector terminal 42. The third connector terminal 81 includes a third wire connecting portion 81*a* and a third contact portion 81*b*. A third wire 90 is connected to the third wire connecting portion 81*a*. The third contact portion 81*b* is connected to a counterpart terminal.

The third holder 82 includes a third main body portion 83, a third partition portion 84, and a third protruding portion 85. The third main body portion 83 has a shape similar to that of the first main body portion 31 and the second main body portion 51. The third partition portion 84 has a shape similar to that of the first partition portion 32 and the second partition portion 52. The third protruding portion 85 has a shape similar to that of the first protruding portion 33 and the second protruding portion 53. The third holder 82 is not provided with the annular rib 34 of the first holder 30 or the annular ribs 54 and 55 of the second holder 50. The third holder 82 locks to the first holder 30. The first holder 30 and the third holder 82 are locked to each other by a locking structure similar to the locking structure of the first holder 30 and the second holder 50. The third holder 82 is locked to the second holder 50. The third holder 82 and the second holder 50 are locked by a locking structure similar to the locking structure of the first holder 30 and the second holder 50. Therefore, the third holder 82 has a configuration for forming these locking structures.

Specifically, a configuration of the third holder 82 on the first holder 30 side is similar to the configuration of the second holder 50 on the first holder 30 side. That is, the third holder 82 includes a locking recess 86*a* that corresponds to the locking recess 56, a locking recess 87*a* that corresponds to the locking recess 57, and a locking recess 88*a* that corresponds to the locking recess 58. In the first holder 30 and the third holder 82, the locking protrusion 36 locks to the locking recess 86*a*, the locking protrusion 37 locks to the locking recess 87*a*, and the locking protrusion 38 locks to the locking recess 88*a*.

Also, a configuration of the third holder 82 on the second holder 50 side is similar to the configuration of the first holder 30 on the second holder 50 side. That is, the third holder 82 includes a locking protrusion 86*b* that corresponds to the locking protrusion 36, a locking protrusion 87*b* that corresponds to the locking protrusion 37, and a locking protrusion 88*b* that corresponds to the locking protrusion 38. In the second holder 50 and the third holder 82, the locking protrusion 86*b* locks to the locking recess 56, the locking protrusion 87*b* locks to the locking recess 57, and the locking protrusion 88*b* locks to the locking recess 58.

The third wire 90 is connected to the third terminal unit 80. The connection site of the third wire 90 in a vehicle can be set as appropriate. In a vehicle, the connection site of the third wire 90 may be a device located near the connection site of the first wire 60 and the connection site of the second wire 64, for example. The outer sheath 66 covering an intermediate portion between the first wire 60 and the second wire 64 also covers an intermediate portion of the third wire 90. Therefore, a cable 268 in this example is a 6-core cable in which 6-core wires 60, 64, and 90 are covered by one sheath 66. An end portion of the third wire 90 extends from an end portion of the sheath 66 and is connected to the third connector terminal 81. The mode of connection between the third wire 90 and the third connector terminal 81 is similar to the mode of connection between the first wire 60 and the first connector terminal 22 and the mode of connection between the second wire 64 and the second connector terminal 42.

The connector housing 270 is formed through insert molding, using the first terminal unit 20, the second terminal unit 40, the third terminal unit 80, an end portion of the first wire 60, an end portion of the second wire 64, and an end portion of the third wire 90 as insert parts.

A configuration may be adopted in which the molded connector 210 is provided with a plurality of sets of the third terminal units 80 and the third wires 90 so as to constitute four or more layers. A configuration may be adopted in which the molded connector is provided with two sets of the third terminal units 80 and the third wires 90 such that the terminal units and the wires constitute four layers. In this case, a configuration may be adopted in which 2-core wires are respectively connected to four terminal units, and thus the molded connector includes an 8-core wire. This 8-core wire may be covered by one sheath and used as an 8-core cable.

Note that configurations described in the above-described embodiments and modification examples can be combined as appropriate as long as no contradiction arises therein. Note that configurations described in the modification examples of Embodiment 1 can be combined with Embodiment 2 as appropriate.

The invention claimed is:

1. A molded connector comprising:

a first terminal unit that includes a first connector terminal and a first holder that holds the first connector terminal;

a second terminal unit that includes a second connector terminal and a second holder that holds the second connector terminal, and is stacked on the first terminal unit;

a first wire connected to the first connector terminal;

a second wire connected to the second connector terminal; and a connector housing configured to receive the first terminal unit, the second terminal unit, an end portion of the first wire, and an end portion of the second wire, the molded connector further comprising a first sheath covering the first wire and a second sheath covering the second wire, wherein the connector housing covers an end portion of the first sheath and the second sheath, a first protruding portion extending from a first protruding surface of the base body portion of the first holder which covers a portion of a first contact portion of the first connector terminal protruding from the first protruding surface, a second protruding portion extending from a second protruding surface of the base body portion of the second holder which covers a portion of a second contact portion of the second connector terminal protruding from the second protruding surface, and the connector housing includes a portion covering the first protruding portion and the second protruding portion and facing the first protruding face and the second protruding face.

2. The molded connector according to claim 1, wherein the first terminal unit is formed by subjecting the first holder to insert molding using the first connector terminal as an insert part, and the second terminal unit is formed by subjecting the second holder to insert molding using the second connector terminal as an insert part.

3. The molded connector according to claim 2, wherein a first wire connecting portion of the first connector terminal that is connected to the first wire protrudes outward of the first holder, and a second wire connecting portion of the second connector terminal that is connected to the second wire protrudes outward of the second holder, and the connector housing covers a connection portion between the first wire and the first wire connecting portion and a connection portion between the second wire and the second wire connecting portion.

4. The molded connector according to claim 3, wherein the first wire connecting portion includes a first bottom plate connected to a core wire of the first wire, the second wire connecting portion includes a second bottom plate connected to a core wire of the second wire, and the first bottom plate and the second bottom plate are present between the core wire of the first wire and the core wire of the second wire.

5. The molded connector according to claim 1, wherein a portion of the connector housing that covers the first holder and the second holder is provided with a hole recessed in a direction in which the first terminal unit and the second terminal unit are stacked on each other.

6. The molded connector according to claim 1, wherein the first holder and the second holder are each provided with a locking portion for positioning the first terminal unit and the second terminal unit in a direction intersecting a direction in which the first terminal unit and the second terminal unit are stacked on each other.

7. The molded connector according to claim 1, further comprising:

a third terminal unit that includes a third connector terminal and a third holder that holds the third connector terminal, and is stacked between the first terminal unit and the second terminal unit; and a third wire connected to the third connector terminal;

wherein the third terminal unit and an end portion of the third wire are the insert parts of the connector housing.

* * * * *